Patented Mar. 16, 1937

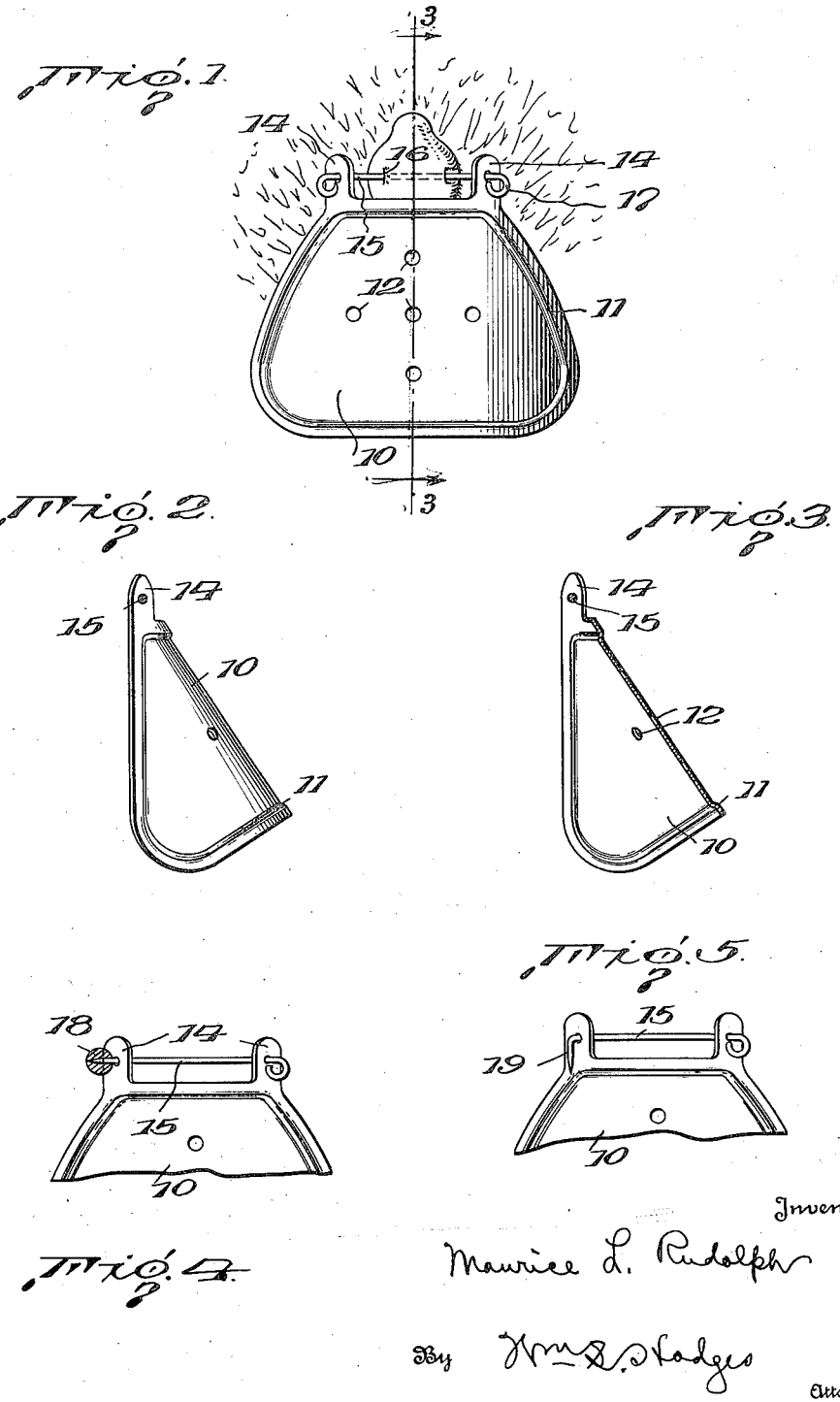

2,074,238

UNITED STATES PATENT OFFICE 2,074,238

PICK OUT SHIELD

Maurice L. Rudolph, Vineland, N. J.

Application September 20, 1935, Serial No. 41,495
In Canada January 19, 1935

2 Claims. (Cl. 119—143)

This invention is an improved device for preventing cannibalism among poultry, and particularly chickens.

Poultry raisers have found that cannibalism is quite common among chickens, presumably induced by a lack of food which contains blood or meat, or both. While this urge exists, laying hens are subject to attack by other chickens in attempts to pick the unlaid eggs out of the vents and to consume them, and not infrequently the hens will pick out and destroy their own unlaid eggs. Similar attacks are often made upon "prolapsed" hens.

Obviously the "pick out" habit is very detrimental to the health of the chickens that are attacked, and efforts have heretofore been made to prevent it, one of the most popular methods being to suspend a protecting metal shield over the vent of the fowl. In practice, such a shield is rigidly attached to a safety pin, the pin shank of which is passed through the rump of the fowl in such manner as to operatively suspend the shield over the vent. This type of shield is open to several objections. First, such a shield is rigidly secured to the body of the safety pin, the pin shank of which is supposed to freely pivot or rotate in the rump of the bird. However, experience has shown that within a short time after the pin has been applied, and as the chicken matures, the flesh will grow over the wide end portions of the safety pin and thereby prevent any pivotal movement whatever. Second, the growth of the flesh over the pin causes inflammation and infection, which is detrimental to the health of the fowl. Third, when the shield is prevented from moving or swinging in harmony with movements of the chicken during walking, the droppings will accumulate upon the surface of the metal shield, resulting in generation of lice, maggots, or the like, to such an extent as to also materially affect the health of the fowl.

The main object of the present invention is to overcome the foregoing objections by providing a pick-out shield which is pivotally supported from the suspension means so as to swing freely at all times irrespective of the growth of the fowl. A further object is to provide a pick-out shield in which the shield is pivotally supported by a straight pin, which is without enlargement of any kind capable of being embedded in the flesh of a growing fowl, the shield being suspended from the pin in such a manner that it will freely swing thereon at all times and under all conditions.

The invention will be hereinafter fully set forth and particularly pointed out in the claims.

In the accompanying drawing:

Figure 1 is a rear elevation illustrating the manner of attaching the shield. Figure 2 is a side elevation. Figure 3 is a vertical sectional view on the line 3—3, Figure 1. Figures 4 and 5 are detail views illustrating means for retaining the shield in position on the suspension pin.

Referring to the drawing, 10 designates the body portion of the shield, which is preferably stamped from sheet metal, and provided with a beaded edge 11. Ventilating openings 12 may be provided if desired, although not essential. The body portion 10 is of approximately trapezoidal form in rear view and also of concavo-convex form so as to conform to the contour of the rear portion of a hen, and in such manner as to cover the vent. Said body is provided with ears 14 extending upwardly from the top edge of the shield, said ears being perforated to receive the shank of a straight pin or a wire-supporting member indicated at 15, and which is passed through the tail head of the chicken, as indicated at 16 in Figure 1. Said ears are so spaced as to straddle the tail head of the chicken and are arranged with their side walls in relatively diverging relation, so that their inner faces will be disposed opposite to said tail head while the shield is in operative position. Preferably the pin 15 is in the form of a straight piece of wire having an eye or loop 17 at one end and sharpened at the other end so that it may be easily passed through the tail head, as shown.

In practice, the device is secured in position by passing the pin successively through the opening in one of the ears 14, then through the tail head and finally through the other ear 14, it being understood that the ears are so relatively spaced as to be disposed on opposite sides of the tail head, but with sufficient clearance to permit free swinging of the shield upon the pin. The pin may be secured in place in various manners, three of which are shown for purposes of illustration, and without intent to limit the invention. In one form illustrated in Figure 4, a soft metal member 18, preferably of spherical form, and perforated to receive the haft of the pin, is pushed over the point and then squeezed into place by pressure applied by a suitable tool, sufficiently to compress the material into firm engagement with the pin. By this arrangement, the eye 17 and the stop member 18 are on the outside of the respective ears 14 and do not come in contact with the tail head of the bird, and said ears, while preventing substantial lateral movement with respect to the tail head, serve to maintain the body of the shield in proper operative position. If desired, in lieu of the member 18, the end of the shield may be turned downwardly as indicated at 19, Figure 5.

The advantages of the invention will be readily understood by those skilled in the art to which the invention belongs. For instance, it will be observed that a very simple form of pick-out shield is provided, in which the shield is free to swing or pivot upon the pin 15 at all times. An important advantage is that by placing the eye 17 and stop member 18 outside of the ears 14, no enlargements are in contact with the flesh of the fowl which may become embedded in the flesh as the fowl matures. Therefore, the possibilities of infection are materially reduced and at the same time the shield is permitted to swing sufficiently free to prevent accumulation of droppings on the surface thereof, thereby reducing the possibility of generation of maggots, lice, etc., which might impair the health of the fowl.

Having thus explained the nature of the invention and described an operative manner of constructing and using the same, although without attempting to set forth all of the forms in which it may be made, or all of the forms of its use, what is claimed is:

1. A vent protector of the character described comprising a body of concavo-convex form shaped to conform to the contour of the rear portion of a chicken, the top edge of said body having upwardly projected ears each having a hole therein, said ears being laterally spaced so as to straddle the tail head of said chicken, and arranged with their side walls in relative diverging relation, so that their inner faces will be disposed opposite to said tail head while the shield is in operative position, and a pivot pin passed through the holes in said ears in such manner as to freely support the body in a depending position, said pin having a straight portion adapted to be passed through said tail head and also having bent portions adjacent the outer faces of said ears for limiting movement of the shield longitudinally of the pin.

2. A vent protector of the character described comprising a body of approximately trapezoidal shape in rear view with the narrowest edge at the top and the widest edge at the bottom, said body being of concavo-convex form so shaped as to conform to the contour of the rear portion of a chicken, upwardly projected ears located at the points of intersection of the top edge and the side edges respectively of said body, each of said ears having a hole therein, said ears being so spaced as to straddle the tail head of said chicken, and arranged with their side walls in relatively diverging relation, so that their inner faces will be disposed opposite to said tail head while the shield is in operative position, a pivot pin having a straight portion passed through the holes in said ears and adapted to be passed through said tail head, and means at the ends of the pin for limiting movement of the shield longitudinally of the pin, said pin and said shield being so constructed and arranged that the shield is free to swing upon said pin while the parts are in operative position.

MAURICE L. RUDOLPH.